R. I. TEETER.
HAND CULTIVATOR.
APPLICATION FILED MAY 9, 1910.
972,289.
Patented Oct. 11, 1910.
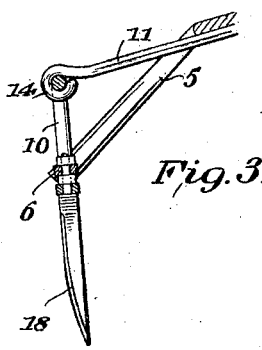
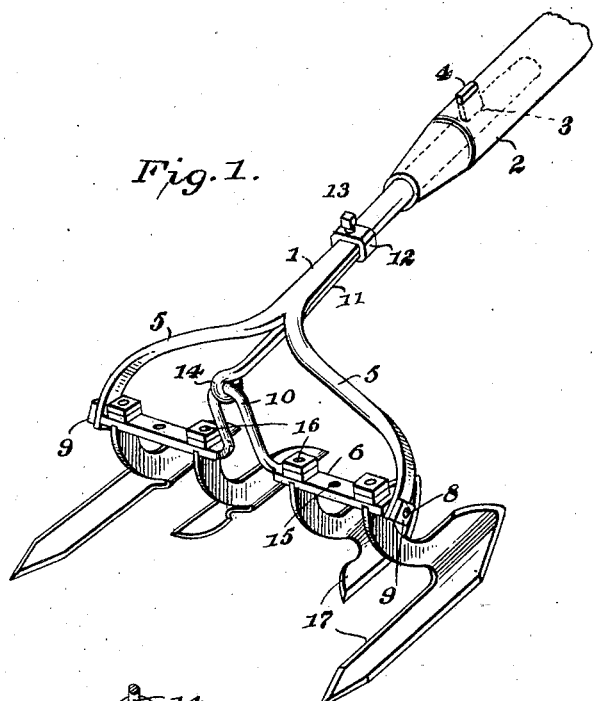
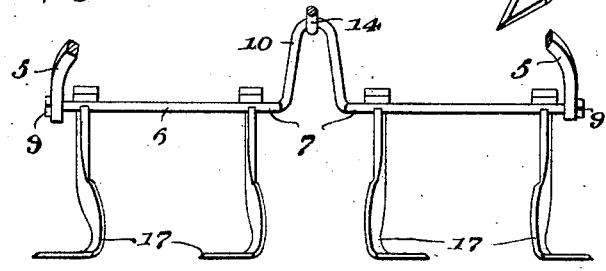
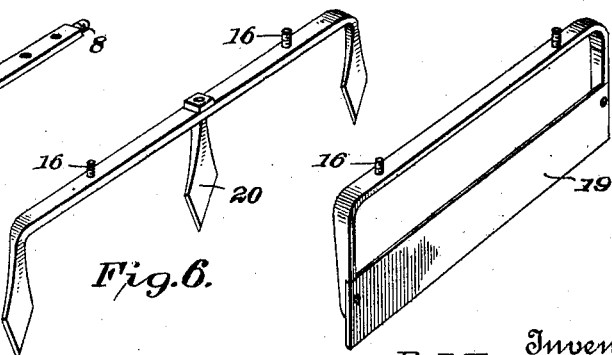
Witnesses
J. Adolph Bishop
C. W. Griesbauer
Inventor
R. I. Teeter
by H. B. Willson & Co.
Attorneys

UNITED STATES PATENT OFFICE.

ROBERT I. TEETER, OF ELLIS, MINNESOTA.

HAND-CULTIVATOR.

972,289.     Specification of Letters Patent.     Patented Oct. 11, 1910.

Application filed May 9, 1910. Serial No. 560,236.

*To all whom it may concern:*

Be it known that I, ROBERT I. TEETER, a citizen of the United States, residing at Ellis, in the county of Cass and State of Minnesota, have invented certain new and useful Improvements in Hand-Cultivators; and I do declare the following to be a full, clear, and exact description of the invention, such as will enable others skilled in the art to which it appertains to make and use the same.

This invention relates to improvements in combination garden tools.

The object of the invention is to provide a garden tool having an improved construction of tool and handle attaching mechanism provided with means whereby the tools may be adjusted with respect to the handle to permit the tools to be operated at any desired angle.

With this and other objects in view, the invention consists of certain novel features of construction, combination and arrangement of parts as will be more fully described and particularly pointed out in the appended claim.

In the accompanying drawings; Figure 1 is a perspective view of my improved tool showing the same arranged in the form of a cultivator; Fig. 2 is a vertical longitudinal section of the same; Fig. 3 is a cross sectional view through the shank showing a rake applied thereto; Fig. 4 is a detail perspective view of the tool beam and adjusting arm removed from the shank; and, Figs. 5 and 6 are detail views of a weeder and marker adapted to be used in connection with the tool.

In the embodiment of the invention I provide a tool and handle connecting shank 1 having its inner end tapered to engage the handle 2 said tapered end of the shank having formed therein a slot or passage 3 whereby a key 4 may be inserted therethrough and through the handle for the purpose of securing the shank in operative engagement with the latter. The outer ends of the shank 1 are bifurcated and said bifurcated ends are bent laterally and forwardly to form beam receiving members 5 in which is pivotally mounted a tool beam 6. The beam 6 is preferably in the form of flat metal bars 7 having reduced and threaded outer ends 8 which are engaged with apertures in the extremities of the bifurcated ends of the shank, said ends being held in engagement with the reduced ends of the bars by nuts 9 or other suitable fastening devices. The bars 7 of the beam are connected together by a centrally disposed offset loop 10 which is formed integral with the bars and provided with a crank whereby the beam may be rocked or turned in the ends of the shank for the purpose of adjusting the tools carried by the beam to any desired angle.

The beam 6 is rocked and secured in its adjusted position by an adjusting bar 11 which has a sliding engagement with the under side of the shank and has provided at its inner end a guide collar 12 which is slidably mounted on the shank and is adapted to be rigidly fastened thereto in its adjusted position by a set screw 13 as shown. In the outer end of the adjusting bar 11 is formed an eye 14 by means of which said end of the bar is loosely connected to the crank loop 10 of the beam whereby the latter is rocked when the bar is adjusted. The bars 7 of the beam are provided with a series of bolt holes 15 which are adapted to receive the fastening bolts 16 of the various forms of implements which are adapted to be interchangeably connected to the beam. In Figs. 1 and 2 of the drawings the implements engaged with the beam are in the form of cultivating plows 17 while in Fig. 3 of the drawings a rake 18 is shown applied to the beam in place of the plows. In Figs. 5 and 6 of the drawings are respectively shown a weeder 19 and a marker 20 which may be engaged with the beam in place of the plows or rake shown applied thereto.

By forming the beam 6 in the manner described and providing the adjusting bar for rocking and fastening the same at different angles the tools carried thereby may be adjusted to the desired inclination for entering the ground to a greater or less extent.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a device of the character described, the combination of a flat-faced shank having diverging arms provided in their spaced ends with alined apertures, a tool carrying beam bent at its center to form a crank loop and having flattened end portions provided with openings, the extremities of said flattened end portions being reduced to provide cylindrical screw threaded pivots, the latter being arranged in the apertures in the arms of the shank, nuts arranged on the projecting threaded extremities of the beam, a tool having securing studs arranged in the openings in the flat-faced portions of the beam, nuts on said securing studs to retain the tool in position, a collar arranged on the flat-faced portion of the shank and having a projecting rod terminating in an eye engaged with the crank loop of the beam and a set screw arranged in said collar to engage said shank and retain the beam in adjusted angular position.

In testimony whereof I have hereunto set my hand in presence of two subscribing witnesses.

ROBERT I. TEETER.

Witnesses:
 CHAS. S. HANLEY,
 A. S. FREEMAN.